United States Patent [19]

Cogan

[11] 4,071,183
[45] Jan. 31, 1978

[54] FABRICATION METHOD AND FABRICATED ARTICLE

[75] Inventor: Richard M. Cogan, Cincinnati, Ohio

[73] Assignee: General Electric Company, Cincinnati, Ohio

[21] Appl. No.: 653,591

[22] Filed: Jan. 29, 1976

Related U.S. Application Data

[62] Division of Ser. No. 569,183, April 18, 1975, Pat. No. 3,996,019.

[51] Int. Cl.² .................................... B23K 19/00
[52] U.S. Cl. ........................... 228/173 A; 228/190; 228/193
[58] Field of Search ............. 228/193, 141 A, 173 A, 228/190, 265

[56] References Cited

U.S. PATENT DOCUMENTS

| | | | |
|---|---|---|---|
| 299,491 | 5/1884 | Naegeley, Jr. | 228/190 X |
| 2,701,483 | 2/1955 | Foxon et al. | 228/141 A X |
| 3,535,766 | 10/1970 | Hymes | 29/421 |
| 3,633,267 | 1/1972 | Deminet | 228/193 |
| 3,670,397 | 6/1972 | Lewis | 228/190 X |
| 3,920,175 | 11/1975 | Hamilton | 228/193 |

Primary Examiner—Donald G. Kelly
Assistant Examiner—K. J. Ramsey
Attorney, Agent, or Firm—Lee H. Sachs; Derek P. Lawrence

[57] ABSTRACT

A fabricated article, including a portion of non-uniform sectional thickness, is provided through an improved method employing a plurality of cooperating, particularly shaped and sized sheet metal members or member portions which, in an article including a cavity, generally define selected inner and outer surfaces of the article. Also employed is at least one particularly shaped and sized insert member to provide increased sectional thickness in a selected portion. The sheet metal members or member portions and the insert member are assembled at bonding surfaces so that the sheet metal members or member portions retain the insert between them. Thereafter, the assembly is fabricated into the article by solid state diffusion bonding at the bonding surfaces.

4 Claims, 12 Drawing Figures

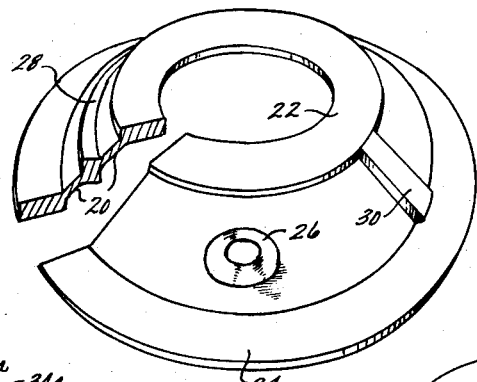
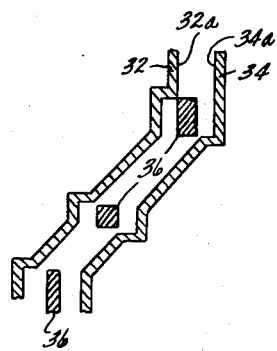
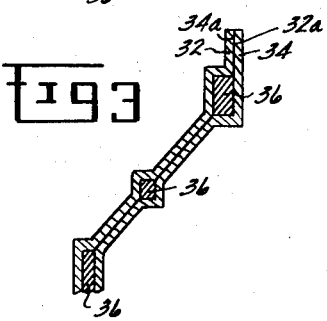
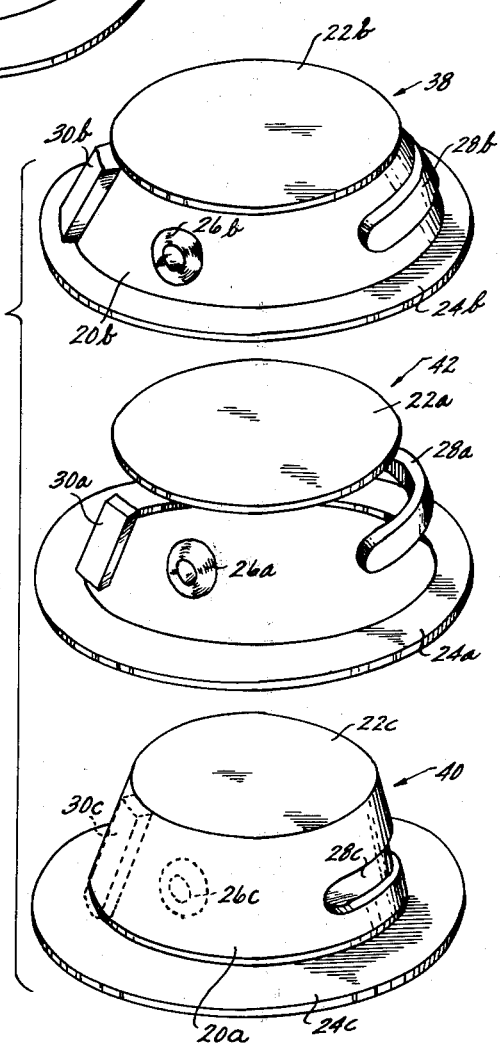

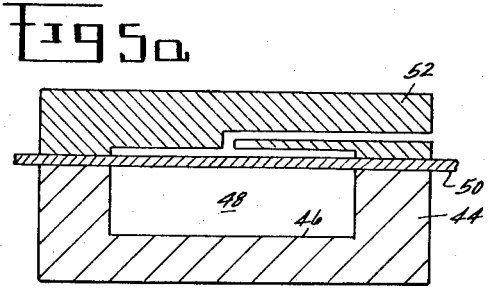
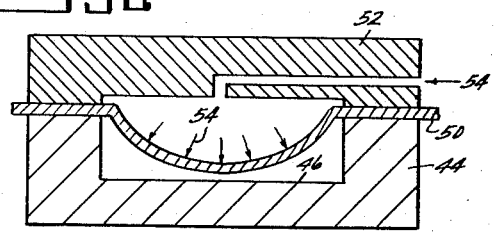
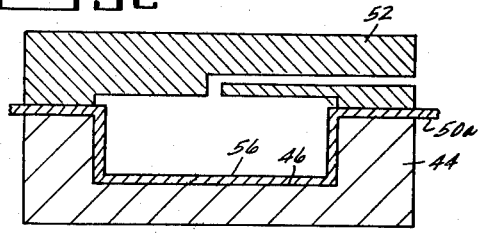
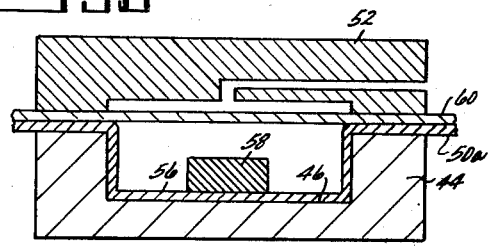
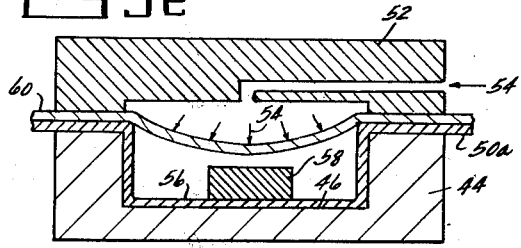
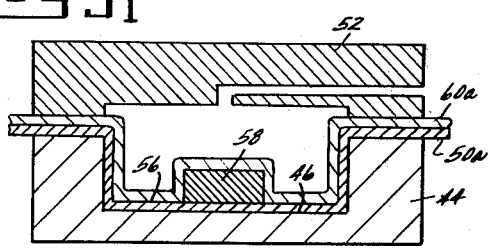
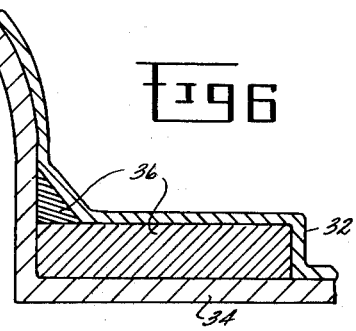
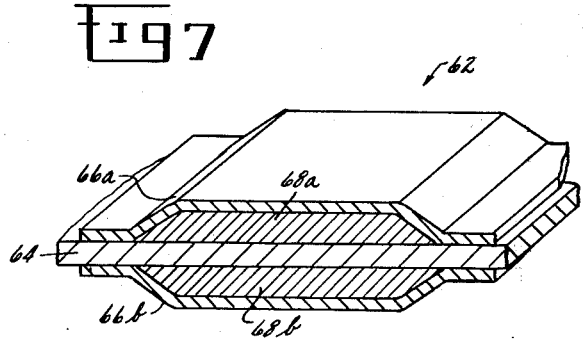

FABRICATION METHOD AND FABRICATED ARTICLE

This is a divisional of application Ser. No. 569,183, filed Apr. 18, 1975, now U.S. Pat. 3,996,019 issued Dec. 7, 1976 and is assigned to the assignee of the present invention.

BACKGROUND OF THE INVENTION

This invention relates to the fabrication of metal articles from a plurality of members and, more particularly, to the fabrication of articles of non-uniform sectional or wall thickness from members including a plurality of sheet metal members.

The manufacture of complex, accurately shaped metal components, for example of the type used in such power producing apparatus as gas turbine engines, has included the steps of providing a forging, frequently of large size, and then machining the forging to provide in certain areas cross-sectional thicknesses approximating that of sheet metal. A typical example of such a structure is a complex titanium compressor casing of varying wall or cross-sectional thickness machined from a large forging. Such an approach has resulted in a material utilization factor of up to 8:1, for example an 800-pound forging is required to produce a 100-pound component.

Obviously, such current manufacturing procedures are costly from the standpoint of inefficient use of labor and of material.

It is a principal object of the present invention to provide an improved manufacturing method for the provision of an article including a portion of non-uniform sectional thickness employing the fabrication of a plurality of relatively simple, inexpensive members.

Another object is to provide such method which employs sheet metal members and the use of solid state diffusion bonding to join members into an article.

Still another object is to provide an improved fabricated article from a plurality of sheet metal and other members.

These and other objects and advantages will be more clearly understood from the following detailed description, the drawings and the examples, all of which are intended to be typical of rather than in any way limiting on the scope of the present invention.

Briefly, the method associated with the present invention for fabricating an article of non-uniform sectional thickness includes the steps of providing a plurality of cooperating sheet metal members or member portions (hereinafter referred to as members) and at least one insert comprising at least one insert member, the insert providing increased sectional thickness in at least one selected portion. Each of the members, including the insert member or members, is provided in a size and shape predetermined by the size and shape of the article and by the size and shape of other members so that together the members define the size and shape of the article. Each sheet metal member has a bonding surface which cooperates with a bonding surface of another member, typically another sheet metal member. Such members are assembled so that cooperating bonding surfaces face one another and so that the sheet metal members retain the insert between them. Thereafter, the sheet metal members are joined at cooperating bonding surfaces through solid state diffusion bonding. This provides an improved fabricated article of non-uniform sectional thickness and which can be considered to be a preform nearly to the shape desired in a finished article. Such a preform requires only a relatively small amount of additional work, such as machining in selected areas, to complete the manufacture.

The fabricated article of the present invention comprises a plurality of such sheet metal members and at least one such insert retained between the sheet metal members which are joined at bonding surfaces through a solid state diffusion joint.

BRIEF DESCRIPTION OF THE DRAWINGS

FIG. 1 is a perspective, partially sectional view of the type of article which can be manufactured according to the method associated with the present invention;

FIG. 2 is an exploded sectional view of a plurality of members employed in the fabrication of an article and appropriately positioned according to the present invention;

FIG. 3 is a sectional view of the assembly of the members of FIG. 2;

FIG. 4 is a perspective, exploded view of members used in the present invention to fabricate the article of FIG. 1;

FIGS. 5a–5f is a sectional, sequential diagrammatic view of one method for the manufacture of such members;

FIG. 6 is a fragmentary sectional view of an article corner strengthened with inserts; and FIG. 7 is a fragmentary sectional view of a wall strengthened by a rib using inserts.

DESCRIPTION OF THE PREFERRED EMBODIMENTS

A variety of fabrication methods have been reported in connection with the manufacture of relatively complex structures. These include fabrication from sheet, bar, forgings, etc. by fusion welding or brazing or both; contour rolling of sections followed by welding or brazing; hot die forging to reduce initial forging envelope; precision casting; and solid state joining.

The fabrication of articles from sheet, bar, forgings, etc. employing fusion welds located close to flanges result in highly stressed portions and is difficult to control from a quality viewpoint. Also, in complex shaped articles, sometimes including bosses, stiffeners and ribs, the weld is required to change abruptly from thin to thick to intermediate sections around the article. Accordingly, it is extremely difficult to obtain sound welds of adequate quality, the manufacture sometimes requiring extensive weld repair and expensive process control. Successful use of brazed joints for joining such members relies on joint design and location to compensate for inferior brazing alloy mechanical properties; brazing alloys are normally weak and ductile or strong and brittle.

Use of contour rolling for reducing raw material envelope will decrease initial material input. However, all of the high cost machining operations still are required.

Precision forging processes can be used in the manufacture of relatively small articles to reduce material utilization and produce articles close to their final configuration. However, the manufacture of large articles, such as compressor casings for gas turbine engines, is beyond the present process capability of precision forging.

Similarly, precision casting can be used for efficient material utilization for relatively small parts. However, it has not been developed to achieve certain property levels and quality levels required in large castings, particularly of titanium or titanium alloys.

Such solid state joining processes as friction welding have been applied in the manufacture of gas turbine engine components, producing joints with strengths equivalent to those of the parent metal. However, one limitation in the use of friction welding is the requirement that the joint result from relative rotation of cooperating members, thus eliminating use of friction welding in the manufacture of such articles as compressor casings and other large static structures.

The present invention is an improvement over known fabrication methods. It employs a combination of particularly sized and shaped, relatively simple mill forms, such as sheet, bar, rod, etc., along with the solid state diffusion bonding process, well known in the metallurgical art and widely reported in the literature. Resulting from practice of the present invention is an article at or near a desired finished shape, requiring only a relatively small amount of additional work, such as machining, drilling, grinding, etc. Thus, as used herein, the term "article" is intended to include those structures which are preforms or preliminary shapes and which might require additional work to complete their manufacture.

The present invention will be more clearly understood with reference to the drawings wherein FIG. 1 represents, in a perspective, partially sectional view, a diagrammatic presentation of a gas turbine engine component model, such as an annular drum or casing, including a variety of typical enlarged portions resulting in the non-uniform sectional thickness found in such a component. For example, the model includes a relatively thin wall 20 between thicker first and second flanges 22 and 24, respectively. Located in wall 20 are such typical enlargements as boss 26, circular ring 28 and rib 30. Together, the wall, flanges, boss, circular ring and rib members define a complex shaped article of non-uniform sectional thickness. The manufacture of the type of article represented by the model of FIG. 1 is one with which the present invention is particularly useful, for example a compressor rotor or a compressor casing.

The principles of the present invention can be understood from the cross-sectional views of FIGS. 2 and 3. FIG. 2 is an exploded, sectional view including members used in the practice of the present invention to manufacture an article. FIG. 3 is a sectional view of a preliminary assembly of such members. FIGS. 2 and 3 include a first sheet metal member 32 of predetermined size and shape and having a bonding surface 32a, a second sheet metal member 34 of predetermined size and shape and having a bonding surface 34a and a plurality of inserts 36 in a variety of predetermined shapes and sizes. Although surfaces such as 32a and 34a are referred to herein as bonding surfaces, it should be understood that some portions of such surfaces may not be used for bonding. For example, portions in contact with an insert may not become bonded with the insert, depending on the insert material, processing conditions, etc. The manufacture of the individual members will be discussed later.

In the practice of the present invention, the members 32, 34 and 36 are positioned as shown in FIG. 2 and then assembled into a preliminary assembly shown in FIG. 3 so that cooperating bonding surfaces 32a and 34a face one another and sheet metal members 32 and 34 retain the inserts 36 between them. Together, such members define the size and shape of the article. The preliminary assembly is placed in a pressure vessel which can be heated, generally and hereinafter called an autoclave, of a type commonly used in the metallurgical art and in which a desired combination of heat and pressure can be applied in amounts and for a time sufficient to diffusion bond the members at cooperating bonding surfaces. Thus, there can be fabricated an article including portions of non-uniform sectional thickness from relatively simple mill forms such as sheet, bar, rod, etc. If the diagrammatic view of FIG. 3 represents a cross-sectional view of a figure of rotation around a central axis, then it can be seen that a complex shaped conical structure thus can be fabricated.

Using the present invention in the fabrication of an article such as the model shown in FIG. 1, a variety of complex shaped sheet metal members and inserts are required. Such members are shown in the perspective, exploded view of FIG. 4. In that figure, a pair of sheet metal members represented by an annular outside shell shown generally at 38 and an annular inside shell shown generally at 40 cooperate with variously shaped and sized insert members or heavy sections shown generally at 42. Thus, wall portions 20a of inside shell 40 and 20b of outside shell 38 in FIG. 4 combine to provide wall 20 of the model of FIG. 1. Similarly, circular ring insert 28a combines with sheet metal portions 28b and 28c, respectively, of the outside and inside shell members, to provide the circular ring 28 of the model of FIG. 1. In order to provide protrusions represented by boss 26 and rib 30 in FIG. 1, those wall portions of inside shell 40, shown in phantom at 26c and 30c, cooperate with inserts 26a and 30a as well as with portions 26b and 30b of outside shell 38 as shown in FIG. 4. Also, flanges 22 and 24 of the model of FIG. 1 are generated by the cooperation of member 22a and surfaces 22b and 22c as well as by member 24a and surfaces 24b and 24c. Thus, together the members of FIG. 4, each of a predetermined size and shape, together define the size and shape of the article model shown in FIG. 1.

After manufacture of the individual members shown in FIG. 4, they are assembled in the order shown in that expanded view, thus placing in juxtaposition or facing one another various cooperating bonding surfaces, for example the outside surface of wall 20a of inside shell 40 and the inside surface of wall 20b of outside shell 38. This assembly of members, the surfaces of which have been cleaned appropriately in preparation for bonding, are placed in an autoclave and heated at a temperature and for a time under pressure sufficient to generate a diffusion bond at the cooperating bonding surfaces. For example, in one evaluation in which the members were made of a titanium alloy consisting essentially of, by weight, 6% Al, 4% V, with the balance Ti and incidental impurities, sometimes referred to as Ti6-4 alloy, the bonding conditions were a temperature of about 1675° F under an inert gas pressure of 130 atmopheres (about 1900 psi) for about 30 minutes. It will be understood, however, that the bonding conditions can be varied within the scope of the present invention, depending at least in part on the material of the members being formed.

It will be recognized by those skilled in the art that such sheet metal members, as 38 and 40 in FIG. 4, can be made employing appropriately shaped pressing dies for each member. However, it has been found more convenient first to shape a sheet metal member such as inside shell 40, and then to use inserts or heavy sections such as are shown generally at 42 in FIG. 4 to generate a cooperating sheet metal member such as outside shell 38 without the use of additional shaping dies. A simplified, sectional, diagrammatic representation of such a method is shown in the sequential views of FIG. 5.

In FIG. 5a, die 44 is provided with a die surface 46, shown to be of simple shape but which can be of any desired configuration, for example of a configuration to provide the shape of inside shell 40 in FIG. 4. Die surface 46 defines walls of die cavity 48. An appropriately sized and shaped first metal sheet 50 is positioned over die cavity 48, as shown in FIG. 5a, and a top die member 52 is placed over sheet 50. Appropriate sealing means, such as a local pinching of sheet 50 in an annular groove and protrusion arrangement, not shown, between die 44 and top member 52, is provided to create a fluid seal between die 44, sheet 50 and top 52. Fluid pressure, such as from an inert gas, diagrammatically represented by arrows 54 in FIG. 5b, is introduced through top 52 against sheet 50 as shown in FIG. 5b to press sheet 50 against die surface 46. This reproduces in the sheet the die surface 46, as shown in FIG. 5c, to provide a first sheet metal member preform 50a having an inside surface 56.

Without removing preform 58 from the die, an appropriately shaped insert or inserts, represented by insert 58 in FIG. 5d, is placed on inside surface 56 and a second appropriately sized and shaped metal sheet 60 is positioned between top die member 52 and first preform 50a as shown in FIG. 5d. The components are sealed as described above and pressure 54 is then applied against second sheet 60 to shape it around insert 58 and against inside surface 56 of first preform 50a, as shown in FIGS. 5e and 5f. In this way, there is generated a second preform 60a matched to the shape of the first preform 50a and around inserts such as 58. The members thus fabricated are removed from the die for appropriate trimming to approach the desired finished article shape and for surface treatment in preparation for solid state diffusion bonding. After such trimming and surface preparation, the first and second preforms 50a and 60a are assembled with inserts such as 58, placed within an autoclave and solid state diffusion bonded.

In a specific example, the article model of FIG. 1 was made from the members of FIG. 4 by first generating outside shell 38 from the above-identified Ti6-4 titanium-base alloy. The outer shell was hot gas pressure, superplastically creep formed in a stainless steel die in the manner shown in FIGS. 5a, 5b and 5c. Insert members 42 were machined from Ti6-4 alloy bar and plate stock and inserted into the outer skin 38, after which they were reassembled in the die as shown in FIG. 5d. The inside shell 40 was then hot superplastically creep formed using the assembled outer shell and insert configurations as the shaping die. The creep forming was conducted at a temperature of about 1500° F under a pressure which initially was about 15 psi and was increased to about 1000 psi. The parts thus generated were then disassembled and chemically cleaned using a typical etchant for titanium alloys, for example, by weight, 15% $HNO_3$, 5% Hf with the balance water. They were then reassembled and the outer and inner shells 38 and 40, respectively, were sealed by vacuum welding to entrap a vacuum between the inside and outside shells with the inserts held therebetween. Then the assembly was diffusion bonded at a temperature of about 1675° F. The diffusion bonding pressure is, to a great extent, dependent on the configuration being bonded, with higher pressure being required to produce sound bonds at fillet radii. It is preferred that a pressure of at least about 500 psi be maintained for most configurations, although pressures as low as 15 psi can be used for more simple shapes. There is no upper limit on the pressure range, other than the capability of the apparatus being used. From a practical and safety viewpoint, it is preferred that the pressure be up to about 2000 psi with the higher pressures being required to generate sharper fillets. The specifically preferred and generally most useful operating range is about 500–1000 psi.

The sheet metal forming or contouring steps associated with the present invention, for example as represented by the sequence illustrated in FIG. 5, can be accomplished by various manufacturing methods: conventional hot or cold drawing, conventional creep or superplastic forming, high energy rate forming such as explosive forming, etc. The method selected must be capable of producing precision sheet metal members in complex shapes. However, in the evaluation of the present invention, superplastic forming by isostatic pressing is the preferred method for use in the present invention, particularly for use with titanium or titanium alloy sheet. Superplasticity, which is the ability of a metal to undergo very high tensile elongation, is a valuable property of titanium sheet which permits tensile elongation in the range of about 500% to 1500%. The use of isostatic pressure in connection with the present invention and titanium sheet enables the precision production of intricate detail in the sheet. Such characteristic along with the utilization of fluid pressure, such as gas pressure, as one-half of a die set provides the present invention with the advantage that it may accomplish a multi-draw operation in a single step.

As with any forming process, localized thinning of the sheet and dimensional tolerance control are of concern. However, using fluid or gas pressure to form the sheet to the configuration of one die, the sheet and die do not contact in the initial forming stages. As a result, the thinning is relatively uniform. Through use of low gas forming pressures to shape the superplastic sheet metal, die wear can be minimized, thereby retaining precise dimensional tolerance under high volume use.

Basic to the present invention is the bonding together of a plurality of cooperating sheet metal members, capturing between them inserts having an external configuration determined by the size and shape of that portion of the article in which it is intended to be used. It will be understood, therefore, that the inserts can be solid or can be porous, hollow, etc. and can be made of a variety of materials, metals, non-metals or their combinations, depending on the intended operating temperature and load conditions of the article.

An important feature of the present invention is the joining of the sheet metal members at cooperating bonding surfaces through solid state diffusion bonding of the type well known in the art. For example, in U.S. Pat. No. 3,588,980 issued June 29, 1971, there is described a method for making a contoured article, such as a turbomachinery blade, one step of which, in one form, includes solid state diffusion bonding. In such a process, the atoms of the material at the interface between members in contact one with the other acquire increased energy from applied heat and in time migrate across the joint, thus growing continuous grains. In this way, there is produced a solid state bond, the quality of which depends on the time, temperature and pressure between the members during processing. In general, the effect of heat is to increase the rate of diffusion and to decrease the time required to achieve the bond; the effect of pressure is to reduce surface roughness and to produce an intimate fit of the members being joined. It will be recognized in the practice of the present invention that a solid state diffusion bond can be achieved not only between the plurality of sheet metal members being joined but also between such sheet metal members and metal inserts retained or captured between such sheet metal members.

In diffusion bonding, preparation of the surface for bonding is of prime importance because surface preparation and surface finish contribute to joint quality. Several methods are available to protect materials such as titanium or titanium alloys from atmospheric contamination during forming and bonding at elevated temperatures. A common method used in conventional titanium processing is to use vacuum furnaces for brazing and heat treatment. Another approach to protection of metal sheets during forming is to utilize the die cavity such as 48 in FIG. 5 as an environmental chamber. This can be accomplished by sealing the die perimeter and providing means to evacuate (or evacuate and then back fill with a non-oxidizing or inert gas) die cavity 48 through the wall of die 44 beneath metal sheet 50 in FIG. 5a. Other methods will suggest themselves to those skilled in the art.

Although some diffusion bonding pressures used in the fabrication of some turbomachinery blading are relatively high, for example 1000 psi or higher, it has been found that the method of the present invention can produce sound sheet-to-sheet bonds at much lower bonding pressure, for example as low as about 1 atmosphere. Such a pressure is easily attainable by welding, such as electron beam welding, the perimeter of two cooperating sheet metal members, entrapping a vacuum between the members. Thus, not only is the assembly prepared for bonding, but also the possibility of contamination is virtually eliminated. However, diffusion bonds which require greater than about 1 atmosphere pressure, either due to the fabrication approach or surface condition of the cooperating sheet metal members, can be achieved by encasing the assembly in a hermetically sealed retort or autoclave containing 1 or more atmospheres of inert gas, such as argon or helium, at room temperature, and then allowing the pressure to increase by trapped gas expansion during a furnace bonding cycle. To completely bond fillet radii, bonding can be accomplished by hot isostatic pressing in a hot gas autoclave where high pressures, for example 1000 psi, are readily and safely attainable.

The present invention will suggest a variety of design alternatives in the fabrication of an article. For example, strengthening relatively sharp corners in articles can be accomplished through the use of one or a plurality of appropriately shaped insert members to define a complex insert retained in the corner by cooperating sheet metal members, for example as shown in the fragmentary sectional view of FIG. 6. Another application of the present invention is shown in the fragmentary sectional perspective view of FIG. 7 in respect to the fabrication of a wall of an article including strengthening ribs shown generally at 62.

In the embodiment of FIG. 7, a central or common first sheet metal member 64 cooperates with a pair of secondary sheet metal members 66a and 66b to retain inserts 68a and 68b thereby generating the rib. It will be understood that common first sheet metal member 64 can cooperate with a single second sheet metal member 66a to enclose insert 68a if a thinner rib is desired. In addition, common sheet metal member 64 can cooperate in a similar manner with one or more additional second sheet metal members and additional inserts in portions of the article adjacent the portion presented in FIG. 7 to fabricate an article having a plurality of ribs.

From these embodiments, it will be readily recognized that the present invention is capable of a wide variety of variations and modifications, all of which are intended to be included within the scope of the appended claims.

What is claimed is:

1. In a method of fabricating a non-planar article including a portion of non-uniform sectional thickness from a plurality of members including a plurality of cooperating sheet metal members and at least one insert member, each sheet metal member having a bonding surface which cooperates with a bonding surface of another member, the steps of:

placing a first metal sheet in a die;
shaping a first non-planar sheet metal member from the first metal sheet in the die by applying fluid pressure to a face of the first metal sheet;
with the first sheet metal member in the die, positioning at least one of the insert members on a surface of the first sheet metal member;
placing a second metal sheet in the die over the insert member and the first sheet metal member;
shaping a second sheet metal member by applying fluid pressure to a face of the second metal sheet to press the second metal sheet over the insert member and the first sheet metal member to retain the insert member between the sheet metal members and to provide a preliminary assembly;
placing the preliminary assembly in an autoclave; and then
conducting a solid state diffusion bonding of the sheet metal members at cooperating bonding surfaces in the autoclave including the concurrent application of fluid pressure and heat.

2. The method of claim 1 including the additional steps after shaping the sheet metal members of:

cleaning bonding surfaces of the sheet metal members to prepare the surfaces for diffusion bonding;
reassembling the members in an autoclave; and then, conducting the solid state diffusion bonding in the autoclave.

3. The method of claim 2 in which the solid state diffusion bonding is conducted under a pressure of about 15 – 2000 psi.

4. The method of claim 3 in which:

the metal sheets are of a material selected from the group consisting of Ti and alloys of Ti;
the first and second metal sheets are shaped into first and second sheet metal members, respectively, by hot gas pressure creep forming; and
the solid state diffusion bonding is conducted under a pressure of about 15 – 1000 psi.

* * * * *